United States Patent [19]

Sekiguchi et al.

[11] Patent Number: 4,794,417
[45] Date of Patent: Dec. 27, 1988

[54] PHOTOGRAPHING APPARATUS

[75] Inventors: Takeshi Sekiguchi, Yokohama; Tsuneaki Kadosawa, Kanagawa; Takashi Kamai, Tokyo, all of Japan

[73] Assignee: Canon Kabushiki Kaisha, Tokyo, Japan

[21] Appl. No.: 914,292

[22] Filed: Oct. 2, 1986

[30] Foreign Application Priority Data

Oct. 4, 1985 [JP] Japan .................................. 60-221555
Sep. 16, 1986 [JP] Japan .................................. 61-217816

[51] Int. Cl.$^4$ ............................................... G03B 3/00
[52] U.S. Cl. ...................................... 354/400; 354/81; 354/195.1; 358/227
[58] Field of Search .................. 354/400, 195.1, 75, 354/76, 81, 163, 168, 169, 293, 402; 352/140, 243; 358/108, 227

[56] References Cited

U.S. PATENT DOCUMENTS

| | | | |
|---|---|---|---|
| 3,538,830 | 11/1970 | Henrikson | 352/140 X |
| 3,550,517 | 12/1970 | Mueller | 354/168 X |
| 3,927,414 | 12/1975 | Moriyama et al. | 354/195.1 |
| 4,236,794 | 12/1980 | Gordon | 354/81 X |
| 4,550,993 | 11/1985 | Taniguchi et al. | 354/402 |
| 4,566,036 | 1/1986 | Kadosawa | 358/227 |

Primary Examiner—W. B. Berkey
Attorney, Agent, or Firm—Fitzpatrick, Cella, Harper & Scinto

[57] ABSTRACT

According to a photographing apparatus of this invention, tilt angles of a photographing optical system at least at two points on a plane and a lens position in an in-focus state or in a zooming state are prestored before a photographing operation. When an object moving on the plane is photographed in practice, the focusing or zooming operation of the photographing lens system is appropriately performed in accordance with the tilt angle of the optical photographing system directed toward the object and the prestored data.

11 Claims, 9 Drawing Sheets

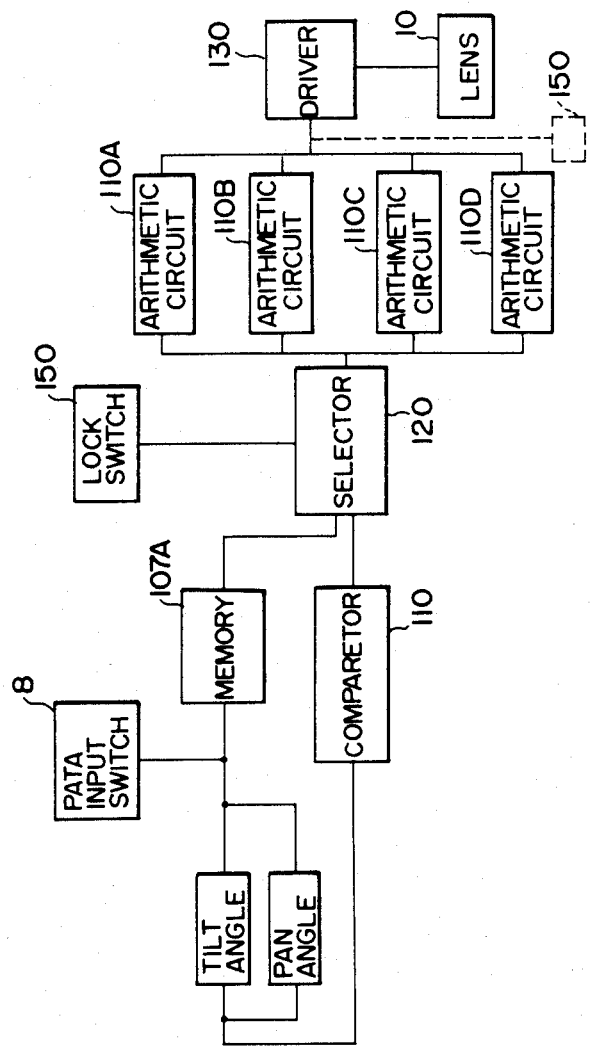

PHOTOGRAPHING APPARATUS

BACKGROUND OF THE INVENTION

1. Field of the Invention

The present invention relates to a photographing apparatus which mounts optical equipment, e.g., a camera or telephoto observation equipment, on its universal head, detects the distance between the setting point of the equipment and a target point, and can automatically control a focusing mechanism of the equipment.

2. Related Background Art

Conventionally, a known universal head apparatus for a television camera has no arrangement for automatically operating optical equipment, e.g., a camera, mounted thereon. Therefore, when the optical equipment, e.g., a camera, is mounted on the known universal head apparatus to perform a photographing operation, an operator of the universal head apparatus or an operator of a camera operates a focusing mechanism of the optical equipment manually or through a remote control unit. However, when an object which moves fast, e.g., in a sport, is to be photographed, this requires skill. Therefore, as sport programs are becoming popular, strong demand has arisen for an automatic focusing mechanism. For example, U.S. Pat. No. 3,538,830 describes a technique for obtaining the distance to an object through triangulation on the basis of the setting height of the camera and its tilt angle. According to this patent, when the distance to the object is measured, the object must be present on a ground plane perpendicular to the direction of gravity, the height of the camera from the ground plate must be substantially constant, and a tilt angle with reference to a plumb line when the camera is inclined must be known.

However, in the conventional method, a gravity pendulum for determining the plumb line is necessary. More specifically, the tilt angle of the universal head apparatus does not always correspond to the tilt angle of the camera with respect to the ground plane, but is an angle with respect to a predetermined plane when the universal head apparatus is arbitrarily set. In a method wherein the displacement of the focusing mechanism of, e.g., a camera is determined in accordance with the tilt angle, the setting position, particularly, the height, of the universal head apparatus must be accurately measured, and the universal head must be arranged to be completely parallel to the ground plane. Therefore, adjustment for accurately setting the apparatus takes a long period of time. Otherwise, accurate focusing displacement cannot be obtained.

Even if the height is accurately obtained with respect to the ground plane to allow the parallel adjustment and the predetermined relationship between the tilt angle of the universal head apparatus and the titt angle of the camera with respect to the horizontal plane can be obtained, when the relationship between a plane formed by the object to be photographed and the camera setting position does not satisfy a regular triangular relationship, it is impossible to obtain the distance to the object.

FIG. 1 illustrates a case wherein the universal head apparatus is arranged at a point H to be perfectly parallel to the ground plane perpendicular to the direction of gravity, e.g., parallel to a ground plane P0P2.

When a plane P0P1 formed by the object forms a predetermined angle $\alpha$ with the plane P0P2, and when triangulation utilizing the regular triangle is adopted, the distance measuring apparatus of the camera arranged at the point H determines, as the distance to the object, a line $\overline{HA'}$, i.e., 11, obtained from a tilt angle $\theta$ formed by a height $\overline{OH}$ and a reference plane P3P4, thus performing focusing. However, in practice, since the distance from the camera to the object corresponds to a line $\overline{HA}$, i.e., 10, the resultant image is often blurred.

In this distance measuring method, when the distance to the object is measured, light reflected from the object is received, and the distance to the object is calculated in accordance with the received light, thereby driving a focusing mechanism. However, in such a distance measuring apparatus, it is difficult to perform focusing with respect to an object having poor contrast or an object having a low light reflection property. In addition, since the light reflected from the object is received, this results in a complex optical system therefor.

SUMMARY OF THE INVENTION

It is a first object of the present invention to provide an automatic focusing apparatus for a photographing apparatus.

It is a second object of the present invention to provide a photographing apparatus which can perform; a photographing operation, particularly, a focusing operation without determining the setting height of the photographing apparatus.

It is a third object of the present invention to provide a photographing apparatus which can perform a photographing operation, particularly, a focusing operation with respect not only to a plane perpendicular to the direction of gravity but also to a plane having an arbitrary inclination.

It is a fourth object of the present invention to provide a photographing apparatus which can appropriately perform a focusing operation even when an object is present on a plane different from the above-mentioned arbitrary plane.

It is a fifth object of the present invention to provide a photographing apparatus which can perform a focusing operation when an operator simply directs a focusing lens toward the object.

It is a sixth object of the present invention to provide a photographing apparatus which can appropriately perform a focusing operation using any interchangeable lenses.

In order to achieve the above objects of the present invention, there is provided a photographing apparatus comprising storage means for storing a signal corresponding to a tilt angle and a lens position of a photographing optical system when the photographing optical system is directed toward and adjusted to at least two reference points on a photographing range formed by an arbitrary substantial plane, and control means for automatically adjusting a lens based on a tilt angle obtained when the photographing optical system is directed toward an object which moves on the photographing range and the signal stored in the storage means. The apparatus further comprises control means for fixing the lens position regardless of the angle of the photographing optical system or for performing a lens operation different from a desired lens position with respect to the above-mentioned plane in accordance with the angle of the photographing optical system when the object is present outside the above-mentioned plane.

The above and other objects, and features of the present invention will be apparent from the accompanying drawings and the following detailed description.

BRIEF DESCRIPTION OF THE DRAWINGS

FIG. 9 is a block diagram of a control circuit according to a third embodiment of the present invention.

DETAILED DESCRIPTION OF THE PREFERRED EMBODIMENTS

A photographing apparatus according to the present invention will now be described with reference to the accompanying drawings.

Figure 2:
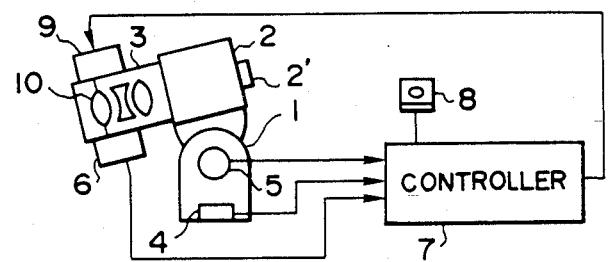
FIG. 2 is a schematic view showing a photographing apparatus of the present invention.

FIG. 2 schematically shows a television photographing apparatus of the present invention. The television photographing apparatus comprises a universal head 1, a television camera main body 2 mounted on the universal head 1, a monitor television 2', a zoom lens barrel 3 mounted on the main body 2 and having a focusing lens 10, a pan angle detector 4 for detecting the pan angle of the universal head 1 (i.e., a pivot angle in the horizontal plane), a tilt angle detector 5 for detecting the tilt angle of the universal head 1 (i.e., a pivot angle in the vertical direction), a focus displacement detector 6 for detecting a focus displacement of the lens 10 in the lens barrel 3, and a focusng mechanism driver 9 for driving the lens 10 of the lens barrel 3. The detectors 4 to 6 and the driver 9 are electrically connected to a controller 7 as the main feature of the present invention. Output signals from the detectors 4 to 6 are obtained by the controller 7 to be stored therein, and are subjected to a focusing arithmetic operation. The driver 9 is controlled by a signal from the controller 7. The controller 7 has a data input switch 8 which is operated by an operator. When the operator operates the switch 8, the output signals from the detectors 4 to 6 are obtained by the controller 7.

Figure 1:
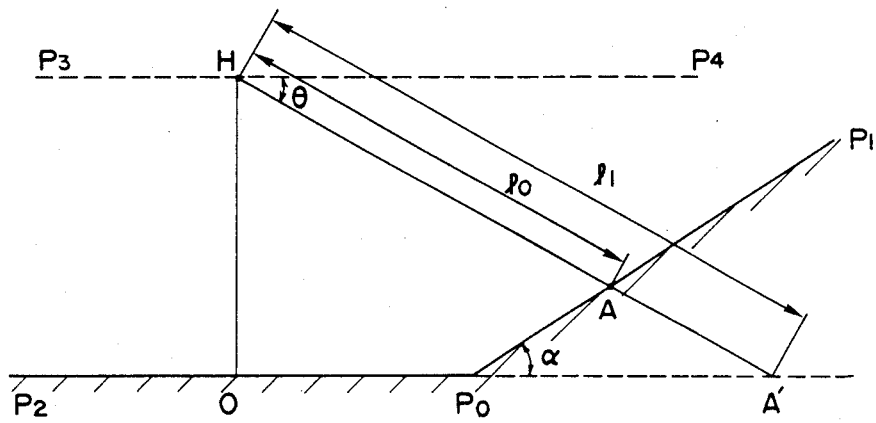
FIG. 1 is a schematic view for explaining a conventional technique.
Figure 3:
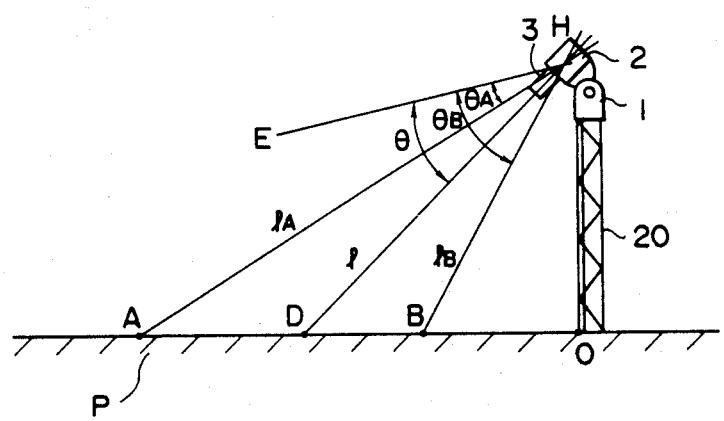
FIG. 3 is a view for explaining the principle and the operation of the present invention.

A first embodiment of the present invention will now be described with reference to FIGS. 3 and 4. The same reference numerals in FIGS. 3 and 4 denote the same parts having the same functions as in FIG. 1. FIG. 3 illustrates a case wherein a runner runs a 100-m track corresponding to a straight line $\overline{AB}$. The straight line $\overline{AB}$ need not always be perpendicular to the direction of gravity, and can be a line along an inclined surface of a hill.

The photographing apparatus of the present invention is arranged on a stand 20 and need only be arranged above the line $\overline{AB}$ (i.e. it can be at any height). Assuming that a point A is a start point and a point B is a goal point, an object D moves along the straight line $\overline{AB}$.

Also assume that the object D can be followed only by changing the tilt angle of the universal head 1. Before practical photographing of the object D, the operator directs the lens barrel 3 toward a reference point (it can be an arbitrary point) A while observing the monitor television 2' and he manually moves the focusing lens 10 in order to focus it on the point A. At this time, the operator depresses the switch 8, so that a tilt angle $\theta A$ from the tilt angle detector 5 arranged on the universal head 1 is stored in a memory 7A of the controller 7 upon instruction from a controller 7C and a lens displacement dA from the displacement detection apparatus is also stored in the memory 7A. Note that the tilt angle $\theta A$ indicates an angle formed by a line $\overline{HA}$ and an arbitrary line $\overline{HE}$ passing through a point H, and the line $\overline{HE}$ need not be a horizontal line or parallel to the straight lien $\overline{AB}$. The operator performs the same operation performed for the point A with respect to a reference point B, different from the point A, on the straight line $\overline{AB}$, so that a tilt angle $\theta B$ of the point B and a lens displacement dB are stored in the memory 7A. Note that the lens displacements dA and dB indicate lens displacements and indirectly indicate the distances 1A and 1B between the photographing apparatus and the points A and B. Thus, the relation dA·A=dB·B can be established.

The principle of the present invention will be explained on the basis of the above-mentioned tilt angle and lens displacement data.

First, an XY coordinate system having the point H as the origin and the line $\overline{HE}$ as the X-axis is taken into consideration. If the coordinates of the reference point A are given by A(XA,YA) and the coordinates of the reference point B are given by B(XB,YB), the respective coordinates are expressed using the above-mentioned tilt angles $\theta A$ and $\theta B$, the lens displacements dA and dB, and the distances 1A and 1B to the object obtained by the lens displacements as follows:

$$A(XA, YA) = (lA\cos\theta, lA\sin\theta)$$
$$B(XA, YB) = (lB\cos\theta, lB\sin g\theta)$$
$$= \{(dA/dB)lA\cos\theta, (dA/dB)lA\sin g\theta)\}$$

If the lens displacement and the tilt angle when the object moving along the line AB is followed by the camera are given by d and $\theta$ and the distance between the camera and the object is given by l, the coordinates D(x, y) of the object D are (l cos $\theta$, l sin $\theta$) and can be expressed by {(dA/dB)lA cos $\theta$, (dA/dB)lA sin $\theta$)}. The line formuia of the line $\overline{AB}$ satisfies the following equation:

$$y - YA = (YB - YA)(x - XA)/(XB - XA)$$

(1)

Therefore, the object D moves along the line given by formula (1).

The lens displacement d for focusing on the object D on the line $\overline{AB}$ is expressed by the following relation on the basis of the above relations:

$$d = \{dA \sin(\theta - \theta A) + dB \sin(\theta - \theta A)\}/\sin(\theta A - \theta B)$$

(2)

Relation (2) reveals that if the tilt angle and the displacement d for focusing are obtained respectively for the reference points A and B, the displacement for a lens for focusing a point D on the line $\overline{AB}$ can be expressed by a function of the tilt angle $\theta$ at the point D.

More specifically, before an operator photographs the object D in practice, the tilt angle and lens displacement data of the reference points A and B are stored in the memory 7A. When the object D is photographed in practice, the operator simply moves the camera 2 so that the object is displayed on the monitor television 2', thereby achieving focusing.

Before the object D is photographed in practice, the operator depresses the switch 8 so that the data of the tilt angle detector 5 and the displacement detection apparatus 6 for the reference points A and B are input to the memory 7A. Next, when the operator simply follows the object D through the monitor television 2', the controller 7C of the controller 7 inputs the tilt angle $\theta$ from the tilt angle detector 5 to the arithmetic circuit 7B. The arithmetic circuit 7B performs the arithmetic operation given by relation (2) using this data in addition to the data stored in the memory 7A. The operation result of the arithmetic circuit 7B, i.e., a signal corresponding to the displacement, drives the focusing mechanism driver 9 to move the focusing lens 10, thus performing a focusing operation.

A second embodiment of the present invention will be described with reference to FIGS. 5 and 6. In the first embodiment, the object is assumed to move along a straight line. In the second embodiment, the object moves on a plane.

Figure 5A:
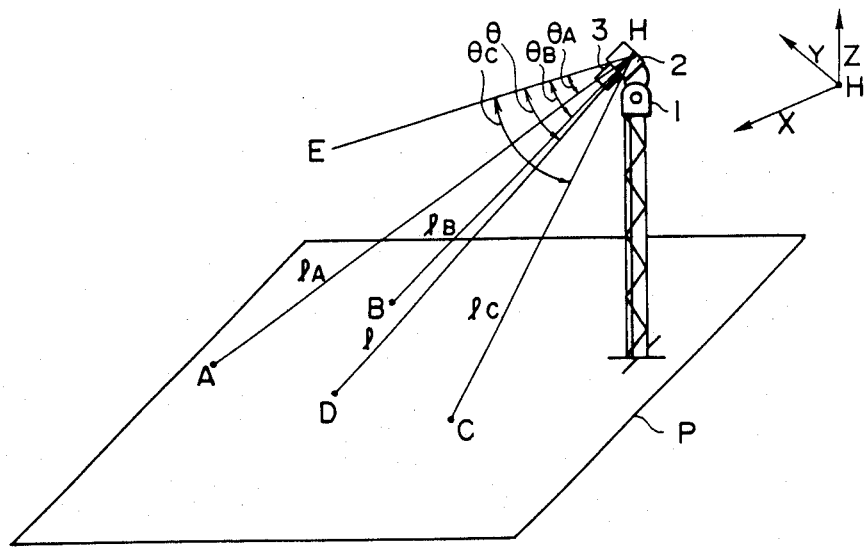
FIGS. 5A and 5B are views for explaining the principle and the operation of the present invention.
Figure 5B:
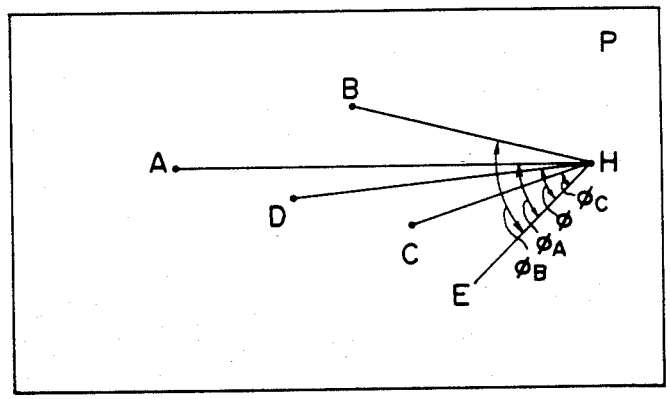
Figure 6:
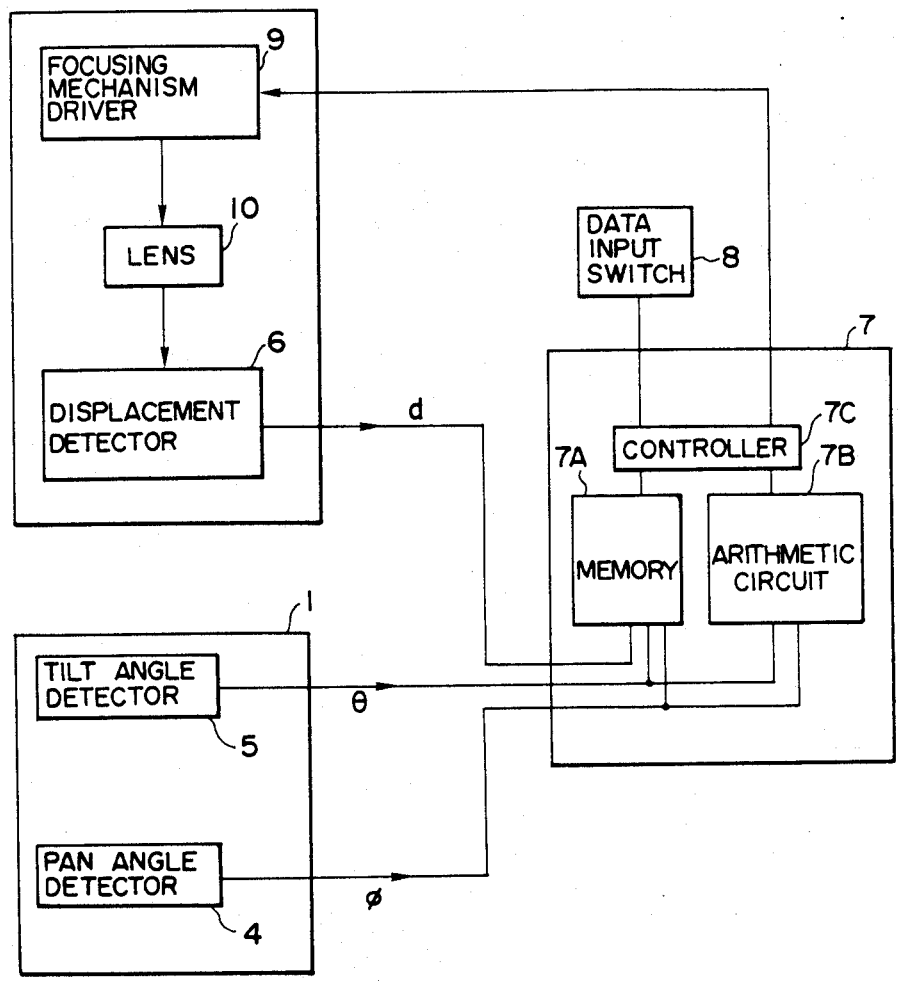
FIG. 6 is a block diagram of a control circuit according to a second embodiment of the present invention.

FIG. 5A is a perspective view showing a state wherein an object on a uniform plane P, e.g., a soccer field, as a measurement object is photographed while a television camera and the like is mounted on a stand 20 having an arbitrary height. FIG. 5B is a plan view when the plane P in FIG. 5A is viewed from above. FIG. 6 is a block diagram showing signal flow. Note that the plane P need not always be perpendicular to the direction of gravity, and can by an inclined field of a hill or the like. The photographing apparatus need only be fixed to the stand 20 so as to allow an easy photographing operation for the operator, and the flatness and the height with respect to the plane P can be neglected. Assume that an object to be photographed by the camera main body 2 moves on the plane P. When the object is to be photographed, the operator chooses different reference points A, B, and C on the plane P and first drives the universal head 1, the camera main body 2, and the focusing lens 10 to perform adjustment for focusing on the point A. The operator then depresses the switch 8 to effect the controller 7C so that a pan angle $\phi A$ and a tilt angle $\theta A$ of the universal head 1 and a lens position dA in the just-in-focus state of the lens 10 are stored in the memory 7A of the controller 7. Note that the tilt and pan angles are determined with reference to a direction toward which the lens barrel 3 is directed when the universal head 1 is fixed to the stand 20, e.g., a line $\overline{HE}$, as in the first embodiment, and indicate angles from the line $\overline{HE}$. The line $\overline{HE}$ need not be parallel to the horizontal line. A lens displacement dA in the just-in-focus state with respect to the reference point A indirectly indicates the distance between the camera and the reference point A, and this distance is given by lA.

The operator then performs the same operation for the reference points B and C as that for the reference point A. In other words, a tilt angle $\theta B$, a pan angle $\phi B$, and a lens displacement dB, i.e., the distance lB, at the point B, and a tilt angle $\theta C$, a pan angle $\phi C$, and a lens displacement dC, i.e., the distance lC, at the point C are respectively stored in the memory 7A.

The distance measurement principle of the present invention will be described below. Taking an XY coordinate system having a point H as a coordinate origin and the line $\overline{HE}$ as the X-axis into consideration. In general, a formula for an arbitrary plane is given by:

$$E \cdot x + F \cdot y + G \cdot z = H$$

(where x, y and z are variables and E, F, G and H are constants.)

If the coordinates of the point A are given by (XA,YA,ZA), the coordinates of the point C are given by (XB,YB,ZB), and the coordinates of the point D are given by (XC,YC,ZC) on the basis of the pan angles $\phi A$, $\phi B$, and $\phi C$, the tilt angles $\theta A$, $\theta B$, and $\theta C$, and the distances lA, lB, and lC, the respective coordinates are respectively expressed by:

(XA,YA,ZA)=(lA cos $\phi A$ sin $\theta A$, lA cos $\phi A$ cos $\theta A$, lA sin $\phi A$)

(XB,YB,ZB)=(lB cos $\phi B$ sin $\theta B$, lB cos $\phi B$ cos $\theta B$, lB sin $\phi B$)

(SC,YC,ZC)=(lC cos $\phi C$ sin $\theta C$, lC cos $\phi C$ cos $\theta C$, lC sin $\phi C$)

The formula for the plane P can be expressed as follows by formula (3):

$$\begin{vmatrix} YB - YA & ZB - ZA \\ YC - YA & ZC - ZA \end{vmatrix} x + \begin{vmatrix} ZB - ZA & XB - XA \\ ZC - ZA & XC - XA \end{vmatrix} y + \qquad (4)$$

$$\begin{vmatrix} XB - XA & YB - YA \\ XC - XA & YC - YA \end{vmatrix} z$$

$$\begin{vmatrix} YB - YA & ZB - ZA \\ YC - YA & ZC - ZA \end{vmatrix} XA + \begin{vmatrix} ZB - ZA & XB - XA \\ ZC - ZA & XC - XA \end{vmatrix} YA +$$

$$\begin{vmatrix} XB - XA & YB - YA \\ XC - XA & YC - YA \end{vmatrix} ZA$$

The object D to be photographed is then viewed through the camera, and if a lens displacement in the just-in-focus stage is given by dD, a pan angle is given by $\phi$, a tilt angle is given by $\theta$, and the distance between the camera and the object is l, the coordinates of the point D, i.e., D(x,y,z), are expressed by (l cos $\phi$sin $\theta$, l cos $\phi$cos $\theta$, l sin $\phi$), and the distance l is expressed by l=dA·lA/dD. Therefore, on the basis of relation (4), the lens position dD at the point D can be expressed by:

$$dD = dA \cdot \left( \begin{vmatrix} YB - YA & ZB - ZA \\ YC - YA & ZC - ZA \end{vmatrix} \cos\phi\sin\theta + \right. \qquad (5)$$

$$\begin{vmatrix} ZB - ZA & XB - XA \\ ZC - ZA & XC - XA \end{vmatrix}$$

$$\left. \cos\phi\cos\theta + \begin{vmatrix} XB - XA & YB - YA \\ XC - XA & YC - YA \end{vmatrix} \sin\phi \right) /$$

-continued $$\left\{ \begin{vmatrix} YB - YA & ZB - ZA \\ YC - YA & ZC - ZA \end{vmatrix} \cos\phi A \sin\theta A + \right.$$

$$\begin{vmatrix} ZB - ZA & XB - XA \\ ZC - ZA & XC - XA \end{vmatrix}$$

$$\left. \cos\phi A \cos\phi A + \begin{vmatrix} XB - XA & YB - YA \\ XC - XA & YC - YA \end{vmatrix} \sin\phi A \right\}$$

As can be seen from relation (5), if at least three points constituting the plane are obtained, the lens displacement for the focusing lens can be obtained as a function of the pan angle $\phi$ and the tilt angle $\theta$. More specifically, data for three different arbitrary points on the plane are detected. When the object D moving on the plane is to be photographed, if the pan angle and the tilt angle of the object D can only be detected, the focusing operation of the object D can be automatically achieved.

When the operator photographs the object D moving on the plane P in practice, he depresses the switch 8 so that the tilt angles, the pan angles, and the displacements for the reference points A, B and C as the three different arbitrary points on the plane P are input to the memory 7A. After the above operation, the operator can simply follow the object D through the monitor television 2', so that the data of the universal head 1 from the tilt angle detector 5 and the pan angle detector 4 are input to the arithmetic circuit 7B. The arithmetic circuit 7B calculates the arithmetic operation given by the relation (5) using this data in addition to the data stored in the memory 7A. The operation result from the arithmetic circuit 7B, i.e., a signal corresponding to the displacement for the focusing lens, drives the focusing mechanism driver 9, thereby effecting the focusing operation.

In the above embodiment, the automatic focusing operation has been exemplified. In this case, a field angle can also be controlled to be interlocked with control for the displacement. If the lens barrel 3 is a zoom lens, magnification control can be performed. In this case, the object can be displayed on the screen to have the same size regardless of a change in distance.

In the above embodiments, the television camera has been exemplified. However, the apparatus of the present invention can be applied to other observation equipment.

Figure 7A:
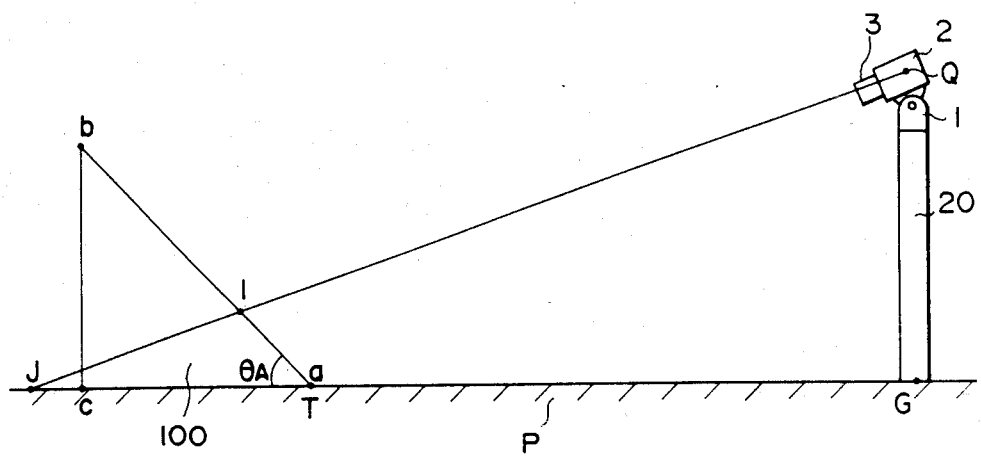
FIGS. 7A to 8B are illustrations for explaining an important improvement of the present invention.
Figure 7B:
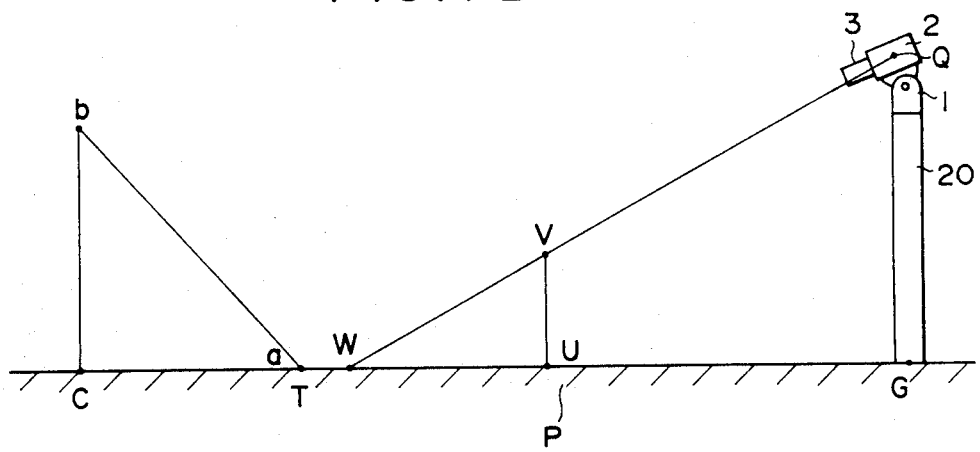

In the above embodiments, the object is assumed to move on a plane having an infinite arbitrary inclination. However, the object is not always under the above-mentioned conditions. An object to be photographed may be present at a location different from a normal photographing plane. FIGS. 7A and 7B exemplify this example. FIGS. 7A and 7B illustrate a state wherein a soccer or baseball game is relayed using a television camera. The television camera is mounted on the stand 20, and seats 100 are arranged at the left of FIGS. 7A and 7B. When the first or second embodiment is applied to FIGS. 7A and 7B, the range for which the focusing operation of the lens is to be performed corresponds to the plane P. However, when the lens barrel 3 is directed toward the seats 100, although a point to be focused must correspond to a point I, the focusing operation is performed for a point J on the plane P, as shown in FIG. 7A, resulting in a defocused image. As shown in FIG. 7B, when an object to be photographed moves upward in FIG. 7B at a point U on the plane P, e.g., when a soccer ball traveling upward is followed by the television camera, although a point to be focused must correspond to a point V, the focusing operation is undesirably performed with respect to a point W.

Figure 8A:
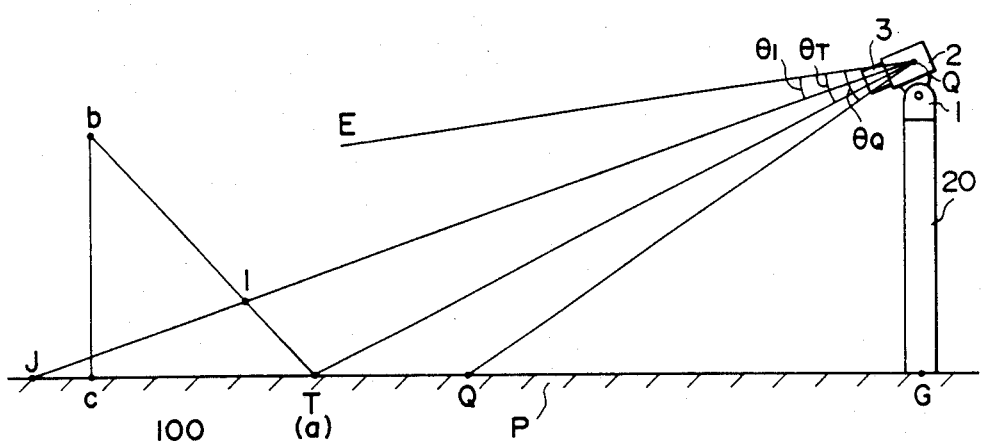
Figure 8B:
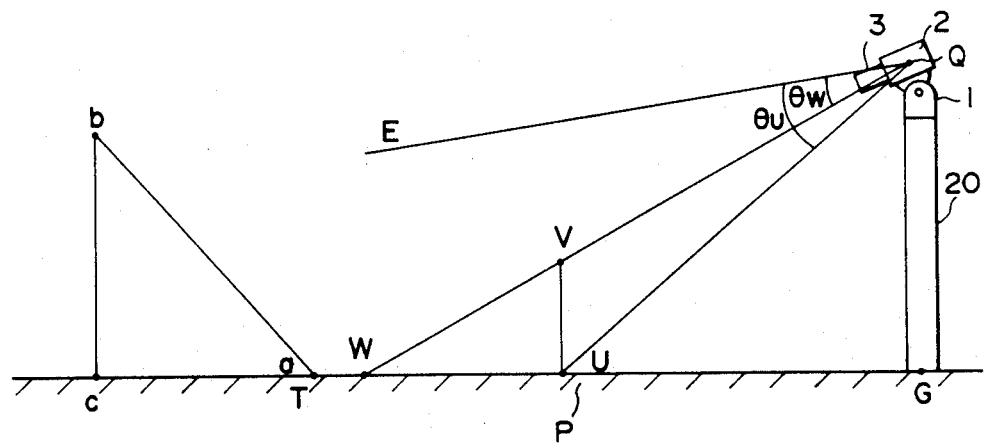

An embodiment that can reliably cope with the conditions shown in FIGS. 7A and 7B will be described hereinafter. A third embodiment shown in FIG. 8A will be described first. FIG. 8A illustrates a case wherein the seats 100 are stationarily located on the plane P, and FIG. 9 shows the flow of a control signal at that time. In FIG. 8A, only a tilt angle is explained for the sake of simplicity. As a matter of course, the above is also applied to a pan angle.

When a limit for the focusing operation on the plane P is known as a limit point T because of the presence of the seats 100, the point T is employed as one of reference points on the plane P as in the above embodiments. The remaining two reference points employ two other different points on the plane P. The tilt angles and the pan angles of these three points with respect to a line $\overline{HE}$, and the lens displacements are stored in a memory 107A upon depression of a switch 8. When the operator wants to image an object and changes a photographing optical axis, a comparator 110 compares a tilt angle $\theta T$ at the point T with a changed tilt angle $\theta$. The condition of the tilt angle $\theta$ can be classified into two cases in accordance with the location of the object, i.e., a case wherein the photographing optical axis is directed toward the seats 100 and a case wherein it is directed toward the plane P. The two cases will be explained below.

① A case wherein the photograhing optical axis is directed toward the point I on the seats 100, i.e., $\theta I < \theta T$.

The comparator 110 compares the tilt angles $\theta I$ and $\theta T$, and determines $\theta I < \theta T$. In response to the output from the comparator 110, a selector 120 selects an arithmetic circuit 110A to calculate a lens displacement at the point T in accordance with data stored in the memory 107A. The operation result is supplied to a driver 130, thereby effecting the focusing operation. More specifically, a focus lock operation corresponding to the lens displacement at the point T is performed to be used as a lens position in the just-in-focus state at the point T. The above case is suitable when a place $\overline{ab}$ of the seats 100 has a shape approximate to part of a circle having a point O as its center, and a radius $\overline{OT}$.

When the place $\overline{ab}$ is quite different from the circular plane having the radius $\overline{OT}$ and can be regarded as a plane, three reference points are assumed on the plane $\overline{ab}$. Before photographing, the pan angles, the tilt angles, and the like for the three reference points on the plane $\overline{ab}$ are input to the memory 107A upon depression of the data input switch 8, as in the second embodiment. Duing the practical photographing operation, when the comparator 110 determines $\theta T > \theta I$, the selector 120 selects an arithmetic circuit 110C to calculate the lens displacement in accordance with the plane formula for the plane $\overline{ab}$, thereby effecting the focusing operation. In this embodiment, the photographing apparatus of the present invention can be applied to a photographing range having a plurality of planes.

② A case wherein the photographing optical axis is directed toward, e.g., a point Q on the plane P, i.e., $\theta Q > \theta T$.

The comparator 110 compares the tilt angles θQ and θT. When the comparator 110 determines θQ≧θT, the selector 120 selects an arithmetic circuit 110B. The lens displacement at the point Q is calcuated together with the data, i.e., the tilt or pan angle, stored in the memory 107A, and the driver 130 is driven in accordance with the operation result, thus effecting the focusing operation. In this case, the formula for obtaining a plane as in the second embodiment is adopted, and the focusing operation is performed in accordance with the tilt angle.

A case will be described hereinafter wherein a player moving on the plane P kicks a ball up to the point U.

When the player kicks up the ball, the operator depresses a lock switch 150, so that the selector 120 selects an arithmetic circuit 110D. The circuit 110D functions so that a lens is locked at a lens position based on a tilt angle θU at the point U. If the operator follows the ball and the tilt angle then changes, the lens is not moved. More specifically, although the lens is kept focused at the point U, it can be substantially focused at the ball going upward. In this embodiment, when the lens position is locked, the arithmetic circuit is used to obtain a constant lens position. However, another lock switch 150 for disconnecting the driver 130 and the arighmetic circuit can also be provided.

In the above embodiments, the television camera main body 2 and the lens barrel 3 are considered to have one-to-one correspondence, and a case wherein photographing lenses are interchanged has not been described. However, when the lens barrel 3 is interchanged with another lens barrel having a different focal length during broadcasting of a program, the initial condition setting must be reset.

In the present application, an embodiment for providing an apparatus which can continue a photographing operation without resetting initial conditions with respect to reference points when lenses are interchanged will be described below.

If the distance between a first photographing lens and an object is given by l1 and the lens position at this time is given by d1, the distance 1 and the lens position d1 have the relation d1=f(l1). If the distance between a second photographing lens and an object is given by l2 and the lens position at this time is given by d2, the distance l2 and the lens position d2 have the relation d2=f(l2). The displacements of the first and second photographing lenses have a predetermined relationship. In this case, d2−F(d1) is established between the displacements d1 and d2.

Figure 10:
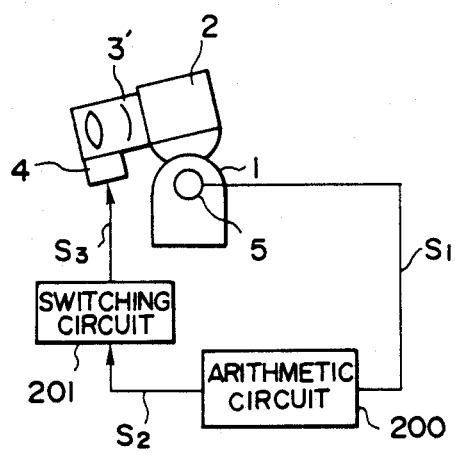
FIG. 10 is a diagram showing the flow of a control signal for explaining a fifth embodiment of the present invention.

FIG. 10 is a circuit diagram of this embodiment. An arithmetic circuit 200 calculates a lens displacement in accordance with a tilt angle of a photographing lens system. When a first lens barrel 3 is mounted, the circuit 200 can supply its output signal directly to a driver 4. However, when a second lens barrel 3' different from the first lens barrel (e.g., in terms of a focal length, a zoom ratio, and the like) is mounted, a signal S2 corresponding to the displacement of the first lens barrel from the circuit 200 is supplied to a converter 201 to be converted into a signal S3 corresponding to the displacement of the second lens barrel in accordance with the above function. The converter 201 can be arranged in the second lens barrel but can be arranged in a control circuit.

According to this embodiment, each time the photographing lenses are interchanged, various data with respect to a photographing plane need not be restored, resulting in convenience.

We claim:
1. A photographing apparatus comprising:
   (a) a photographing optical system having displaceable optical means;
   (b) angle detection means for detecting a tilt angle of said photographing optical system;
   (c) position detection means for detecting a position of said optical means;
   (d) storage means for storing detection signals from said angle detection means and said position detection means when said photographing optical system is adjusted to a plurality of different points within a predetermined photographing range;
   (e) first control means for outputting displacement data for displacing said optical means in accordance with an angle signal from said angle detection means and the storage signal in said storage means when the angle falls within a predetermined range;
   (f) second control means for outputting data for setting said optical means in a predetermined state based on the angle signal when the angle falls outside the predetermined range; and
   (g) drive means for driving said optical means in accordance with the outputs from said first and second control means.

2. An apparatus according to claim 1, wherein said second control means functions to lock said optical means at a predetermined position.

3. An apparatus according to claim 1, further including means for designating an angle range in which said first control means performs a control operation.

4. An apparatus according to claim 1, wherein said predetermined range has at least two planes.

5. An apparatus according to claim 4, wherein said storage means stores angles and lens positions for a plurality of points on the respective planes.

6. An apparatus according to claim 5, wherein said predetermined range has at least first and second photographing planes, said first control means outputs first displacement data for displacing said optical means with respect to said first photographing plane, and said second control means outputs second displacement data for displacing said optical means with respect to said second photographing plane.

7. A phototgraphing apparatus comprising:
   (a) a photographing lens system having a displaceable focusing lens;
   (b) detection means for detecting an inclination of the focusing lens when said photographing lens system is directed toward an object present on a plane;
   (c) an arithmetic circuit, connected to said detection means, for calculating lens position data so that said photographing lens system can be approximately focused on the object on the plane,
   wherein the lens position dD of said displaceable focusing lens is expressed by an equation:

$$dD = dA \cdot \left( \left| \begin{array}{cc} YB - YA & ZB - ZA \\ YC - YA & ZC - ZA \end{array} \right| \cos\phi \sin\theta + \left| \begin{array}{cc} ZB - ZA & XB - XA \\ ZC - ZA & XC - XA \end{array} \right| \cos\phi \cos\theta + \left| \begin{array}{cc} XB - XA & YB - YA \\ XC - XA & YC - YA \end{array} \right| \sin\phi \right) /$$

-continued $$\left\{ \left| \begin{matrix} YB - YA & ZB - ZA \\ YC - YA & ZC\,ZA \end{matrix} \right| \cos \phi A \sin \theta A + \right.$$

$$\left| \begin{matrix} ZB - ZA & XB - XA \\ ZC - ZA & XC - XA \end{matrix} \right| \cos \phi A \cos \phi A +$$

$$\left. \left| \begin{matrix} XB - XA & YB - YA \\ XC - XA & YC - YA \end{matrix} \right| \sin \phi A \right\}$$

where (XA, YA, ZA), (XB, YB, ZB), and (XC, YC, ZC) are coordinate values of three points A, B, and C on the plane respectively, dA is the displacement of said displaceable focusing lens when focus adjusting is made for said A point, and φA and θA are a plan angee and a tilt angle for point A, respectively, and φ and θ are a pan angle and a tilt angle, respectively, when said photographing lens is directed to any point D on the plane; and (d) drive means for driving said focusing lens in accordance with the position data.

8. An apparatus according to claim 7, further including lock means for stopping said focusing lens when the tilt angle becomes a predetermined angle.

9. An apparatus according to claim 7, wherein the plane consists of a plurality of planes.

10. A photographing apparatus comprising:
(a) a photographing lens system having a displaceable focusing lens;
(b) detection means for detecting an inclination of the focusing lens when said photographing lens system is directed toward an object present on a plane;
(c) an arithmetic circuit, connected to said detection means, for calculating lens position data so that said photographing lens system can be approximately focused on the object on the plane, wherein the lens position dD of said displaceable focusing lens is exprsssed by an equation:

$$dD = dA \cdot \left( \left| \begin{matrix} YB - YA & ZB - ZA \\ YC - YA & ZC - ZA \end{matrix} \right| \cos \phi \sin \theta + \right.$$

$$\left| \begin{matrix} ZB - ZA & XB - XA \\ ZC - ZA & XC - XA \end{matrix} \right| \cos \phi \cos \theta +$$

$$\left. \left| \begin{matrix} XB - XA & YB - YA \\ XC - XA & YC - YA \end{matrix} \right| \sin \phi \right) /$$

$$\left\{ \left| \begin{matrix} YB - YA & ZB - ZA \\ YC - YA & ZC\,ZA \end{matrix} \right| \cos \phi A \sin \theta A + \right.$$

$$\left| \begin{matrix} ZB - ZA & XB - XA \\ ZC - ZA & XC - XA \end{matrix} \right| \cos \phi A \cos \phi A +$$

$$\left. \left| \begin{matrix} XB - XA & YB - YA \\ XC - XA & YC - YA \end{matrix} \right| \sin \phi A \right\}$$

where (XA, YA, ZA), (XB, YB, ZB), and (XC, YC,ZC) are coordinate values of three points A, B, and C on the plane respectively, dA is the displacement of said displaceable focusing lens when focus adjusting is made for said A point, and φA and θA are a plan angle and a tilt angle for point A, respectively, and φ and θ are a pan angle and a tilt angle, respectively, when said photographing lens is directed to any point D on the plane;
(d) a converter for converting the displacement data into displacement signal suitable for displaceable focusing lens of another interchangeable lens; and
(e) a driver for driving said focusing lens in accordance with the output from said converter.

11. An apparatus according to claim 10, wherein said interchangeable optical lens is a plurality of lenses, which have a predetermined relationship therebetween.

* * * * *

UNITED STATES PATENT AND TRADEMARK OFFICE
CERTIFICATE OF CORRECTION

PATENT NO. : 4,794,417            Page 1 of 3

DATED : December 27, 1988

INVENTOR(S) : Sekiguchi, et al.

It is certified that error appears in the above-identified patent and that said Letters Patent is hereby corrected as shown below:

COLUMN 1
     Line 33, change "ground plate" to --ground plane--; and
     Line 55, change "titt angle" to --tilt angle--.

COLUMN 2
     Line 3, change "obtianed" to --obtained--; and
     Line 24, change "perform;" to --perform--.

COLUMN 3
     Line 43, change "focusng" to --focusing--.

COLUMN 4
     Line 16, change "straight lien" to --straight line--;
     Lines 42-44, change "B(XA,YB)" to --B(XB,YB)--;
                change "Bsingθ)" to --Bsinθ)--; and
                change "Asingθ)}" to --Asinθ)}--.

COLUMN 5
     Line 38, change "by" to --be--.

COLUMN 6
     Lines 25-26, change "(SC,YC,ZC)=(1C cos φC sin θC, 1C cos φC cos θC, 1C sin φC)" to --(XC,YC,ZC)=(1C cos φC sin θC, 1C cos φC cos θC, 1C sin φC)--; and
     Lines 40-41, change "$\begin{vmatrix} ZB - ZA & XB - XA \\ ZC - XA & XC - XA \end{vmatrix}$" to --$\begin{vmatrix} ZB - ZA & XB - XA \\ ZC - ZA & XC - XA \end{vmatrix}$--.

UNITED STATES PATENT AND TRADEMARK OFFICE
CERTIFICATE OF CORRECTION

PATENT NO. : 4,794,417

DATED : December 27, 1988

INVENTOR(S) : Sekiguchi, et al.

It is certified that error appears in the above-identified patent and that said Letters Patent is hereby corrected as shown below:

<u>COLUMN 8</u>
    Line 34, change "photograhing" to --photographing--.

<u>COLUMN 9</u>
    Line 4, change "calucated" to --calculated--;
    Line 24, change "arighmetic" to --arithmetic--;
    Line 41, change "distance 1" to --distance 11--; and
    Line 48, change "d2-F(d1)" to --d2=f(d1)--.

<u>COLUMN 10</u>
    Line 46, change "phototgraphing" to --photographing--.

<u>COLUMN 11</u>
    Lines 4-5, change "$\begin{vmatrix} YB-YA & ZB-ZA \\ YC-YA & ZCZA \end{vmatrix} \cos \phi A \sin \theta A +$" to --$\begin{vmatrix} YB - YA & ZB - ZA \\ YC - YA & ZC - ZA \end{vmatrix} \cos \phi A \sin \theta A +$--; and
    Line 20, change "plan angee" to --pan angle--.

<u>COLUMN 12</u>
    Line 2, change "exprsssed" to --expressed--;
    Lines 15-16, "$\begin{vmatrix} YB-YA & ZB-ZA \\ YC-YA & ZCZA \end{vmatrix} \cos \phi A \sin \theta A +$" to --$\begin{vmatrix} YB-YA & ZB-ZA \\ YC-YA & ZC-ZA \end{vmatrix} \cos \phi A \sin \theta A +$--;
    Line 26, change "YC,ZC)" to --YC, ZC)--; and
    Line 30, change "plan angle" to --pan angle--.

UNITED STATES PATENT AND TRADEMARK OFFICE
CERTIFICATE OF CORRECTION

PATENT NO. : 4,794,417

DATED : December 27, 1988

INVENTOR(S) : Sekiguchi, et al.

Page 3 of 3

Figure 4:
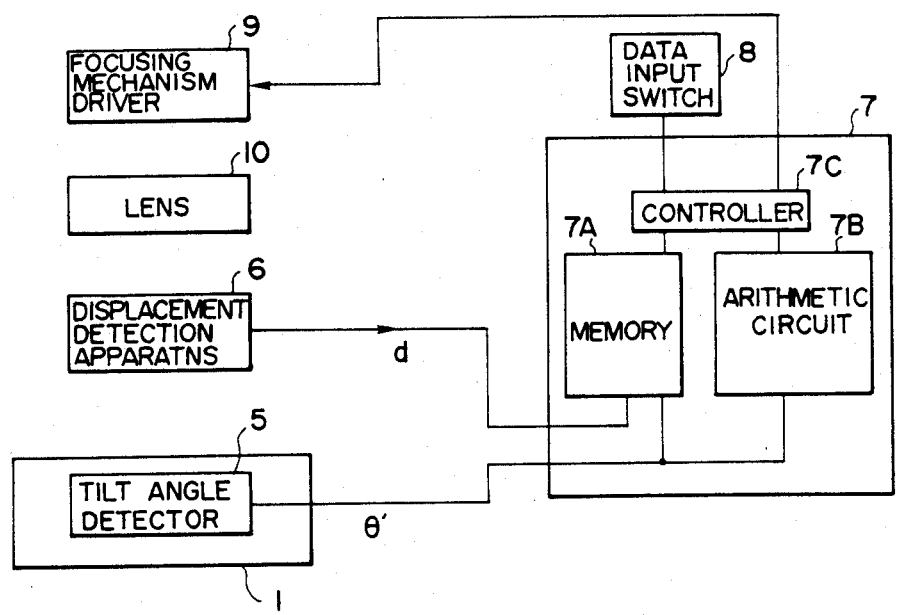
FIG. 4 is a block diagram of a control circuit according to a first embodiment of the present invention.

It is certified that error appears in the above-identified patent and that said Letters Patent is hereby corrected as shown below:

COLUMN 53
Fig. 4, change "DISPLACEMENT DETECTION APPARATNS" to --DISPLACEMENT DETECTION APPARATUS--.

COLUMN 58
Fig. 9, change "COMPARETOR" to --COMPARATOR--.

Signed and Sealed this

Thirteenth Day of February, 1990

Attest:

JEFFREY M. SAMUELS

Attesting Officer     Acting Commissioner of Patents and Trademarks